United States Patent
Belford

(10) Patent No.: US 7,520,695 B2
(45) Date of Patent: Apr. 21, 2009

(54) WATER PROVISIONING DEVICE

(75) Inventor: James-Wallace Belford, Mobile Post Hefer (IL)

(73) Assignee: Netafim Ltd., Tel Aviv (IL)

( * ) Notice: Subject to any disclaimer, the term of this patent is extended or adjusted under 35 U.S.C. 154(b) by 231 days.

(21) Appl. No.: 11/395,155

(22) Filed: Apr. 3, 2006

(65) Prior Publication Data

US 2007/0231070 A1    Oct. 4, 2007

(51) Int. Cl.
    *E02B 13/00*  (2006.01)
(52) U.S. Cl. .......................................... 405/39
(58) Field of Classification Search .................. 405/36, 405/37, 39, 40, 41, 118, 119
    See application file for complete search history.

(56) References Cited

U.S. PATENT DOCUMENTS

| | | | | |
|---|---|---|---|---|
| 3,142,639 A | * | 7/1964 | Baer et al. ................... | 210/765 |
| 3,822,715 A | * | 7/1974 | Rao ............................ | 137/140 |
| 3,825,120 A | * | 7/1974 | Takahashi ................... | 210/104 |
| 4,035,299 A | * | 7/1977 | Vroeginday ............. | 210/167.27 |
| 5,364,034 A | * | 11/1994 | Hirahara ..................... | 239/565 |
| 5,720,875 A | * | 2/1998 | Stegall et al. ............... | 210/108 |
| 6,056,886 A | * | 5/2000 | Hickok et al. ............... | 210/776 |
| 6,264,838 B1 | * | 7/2001 | Nivens, Jr. .................. | 210/602 |
| 2004/0222321 A1 | | 11/2004 | Golan et al. | |

FOREIGN PATENT DOCUMENTS

| | | | |
|---|---|---|---|
| JP | 2002335611 | * | 11/2002 |
| WO | 2004/098269 A2 | | 11/2004 |

* cited by examiner

*Primary Examiner*—Frederick L Lagman
(74) *Attorney, Agent, or Firm*—The Nath Law Group; Jerald L. Meyer; Jonathan A. Kidney

(57) ABSTRACT

A water provisioning device for use with an irrigation channel for providing water into an irrigation pipe. The water provisioning device comprises a primary reservoir adapted to maintain water up to a predetermined level and comprising a primary outlet adapted for being brought in fluid communication with the irrigation pipe. The system further comprises at least one primary inlet tube in the form of a siphon tube with a proximal end manually insertable into said channel for drawing water therefrom and a distal end adapted for the initiation of suction within the tube and for the disposition in said reservoir at least after the suction has been initiated, to supply said water thereto.

12 Claims, 9 Drawing Sheets

WATER PROVISIONING DEVICE

FIELD OF THE INVENTION

This invention relates to devices adapted to supply water to irrigation systems, in particular to low-pressure irrigation systems.

BACKGROUND OF THE INVENTION

In many developing nations, irrigation of crops is performed as cheaply as possible, due to lack of funds and technical know-how. Typically, water for irrigation of a field is brought to the field in a raised irrigation channel, which is usually open and in the shape of a long trough. A sluice gate is opened adjacent to the field, flooding it and saturating the soil thereof. Alternatively, a tube may be used to siphon water onto the field. Besides the lack of control of the amount of water to be supplied to the field, this method of irrigation may lead to introduction of impurities in the water to the field, adversely affecting soil and crop quality, compacting of the soil, oversupply of water to the field, and introduction of disease to the soil.

Often, besides the lack of funds and technical know-how necessary to obtain and operate a conventional sophisticated higher pressure micro-irrigation system, external power sources are not typically available in the fields which would be necessary to run such a system, even if it were available.

SUMMARY OF THE INVENTION

According to the present invention, there is provided a water provisioning device for use with an irrigation channel for providing water into an irrigation pipe. The water provisioning device comprises a primary reservoir adapted to maintain water up to a predetermined level and comprising a primary outlet adapted for being brought in fluid communication with the irrigation pipe. The system further comprises at least one primary inlet tube in the form of a siphon tube with a proximal end manually insertable into said channel for drawing water therefrom and a distal end adapted for the initiation of suction within the tube and for the disposition in said reservoir at least after the suction has been initiated, to supply said water thereto.

By providing such a device, the amount of water supplied to a field from an irrigation channel may be controlled using only the potential energy of the water therein, such as due to its differential height, with no need for external energy sources.

The irrigation pipe may constitute a part of a low-pressure irrigation system.

The primary inlet tube may be rigid and have a bent, e.g. U-like, shape or it may comprise at least one flexible portion, allowing the tube to take a first, suction initiation position, and a second, water supply position.

Thus, the distal end of the primary inlet tube may be provided with a filter. Since the distal end is disposed substantially within the primary reservoir and may further be maintained below the level of water therein, the filter is protected, thereby extending its useful life.

The primary outlet of the primary reservoir may be fitted with a strainer on an upstream end thereof facing the interior of the reservoir for preventing, inter alia, a filter from being drawn into the primary outlet. The strainer may be formed integrally with the primary outlet.

The water provisioning device may further comprise a secondary reservoir adapted to hold a predetermined amount of water and comprising a secondary outlet, which may be in the form of a siphon tube, adapted for bringing the secondary reservoir into fluid communication with the primary reservoir. The secondary reservoir further comprises at least one secondary inlet tube in the form of a siphon tube with a proximal end manually insertable into said channel for drawing water therefrom and a distal end adapted for the initiation of suction therewithin and for the disposition in said secondary reservoir at least after the suction has been initiated, to supply said water thereto. The secondary reservoir may be used to provide fertigation to the water in the primary reservoir during irrigation.

The secondary outlet may be in the form of an additional siphon tube having tube with a proximal end manually inserted into said reservoir for drawing water therefrom and a second end adapted for the initiation of suction therewithin and for the disposition in said primary reservoir at least after the suction has been initiated, to supply water from the secondary reservoir into the primary reservoir.

The distal end of the at least one secondary inlet tube and/or secondary outlet may be provided with a filter.

According to another aspect of the present invention, there is provided a siphon tube for use with an irrigation channel. The siphon tube has a proximal end adapted for manual introduction into the channel for drawing water therefrom, and a distal end adapted for connection to an irrigation pipe, the distal end comprising a filter.

BRIEF DESCRIPTION OF THE DRAWINGS

In order to understand the invention and to see how it may be carried out in practice, embodiments will now be described, by way of a non-limiting example only, with reference to the accompanying drawings, in which.

DETAILED DESCRIPTION OF EMBODIMENTS

Figure 1:
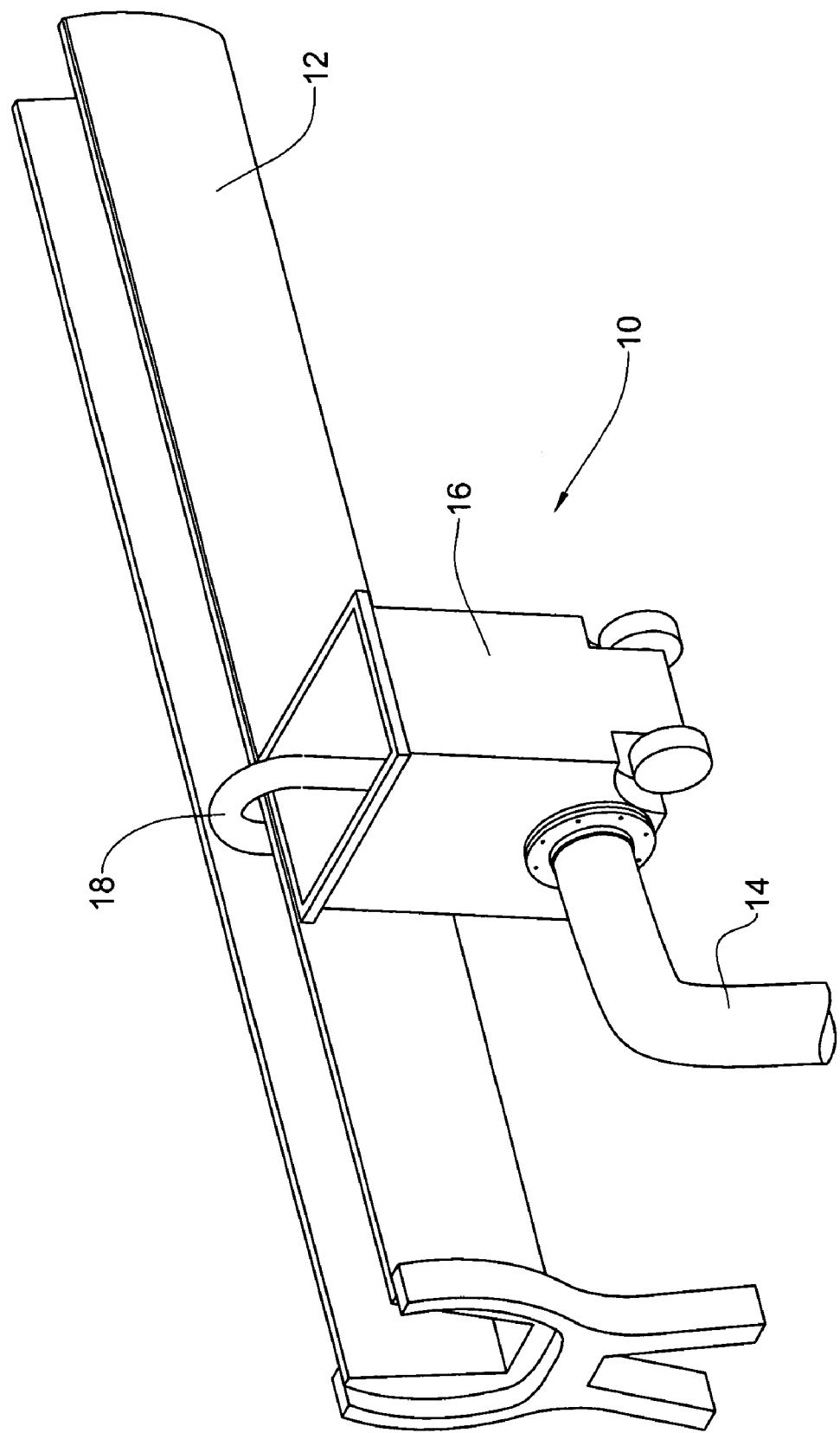
FIG. 1 is a perspective view of a water provisioning device according to one embodiment of the present invention, shown in use in conjunction with an irrigation channel and an irrigation pipe.

FIG. 1 illustrates one example of a water provisioning device, according to the present invention, generally indicated at 10, which is adapted for use with an irrigation channel 12. The water provisioning device is shown connected to an irrigation pipe 14, which constitutes a part of a low-pressure irrigation system (not illustrated), e.g. such as disclosed in WO 04/098269, corresponding to US 2004/222321, of the Applicant, the contents of which are incorporated herein by reference.

The water provisioning device 10 comprises a primary reservoir 16 and a primary inlet tube 18 having a proximal end and a distal end (not seen in FIG. 1). The primary reservoir 16 is further provided with wheels 17, in order to facilitate quick relocation of the water provisioning device 10 by a single user.

Figure 2:
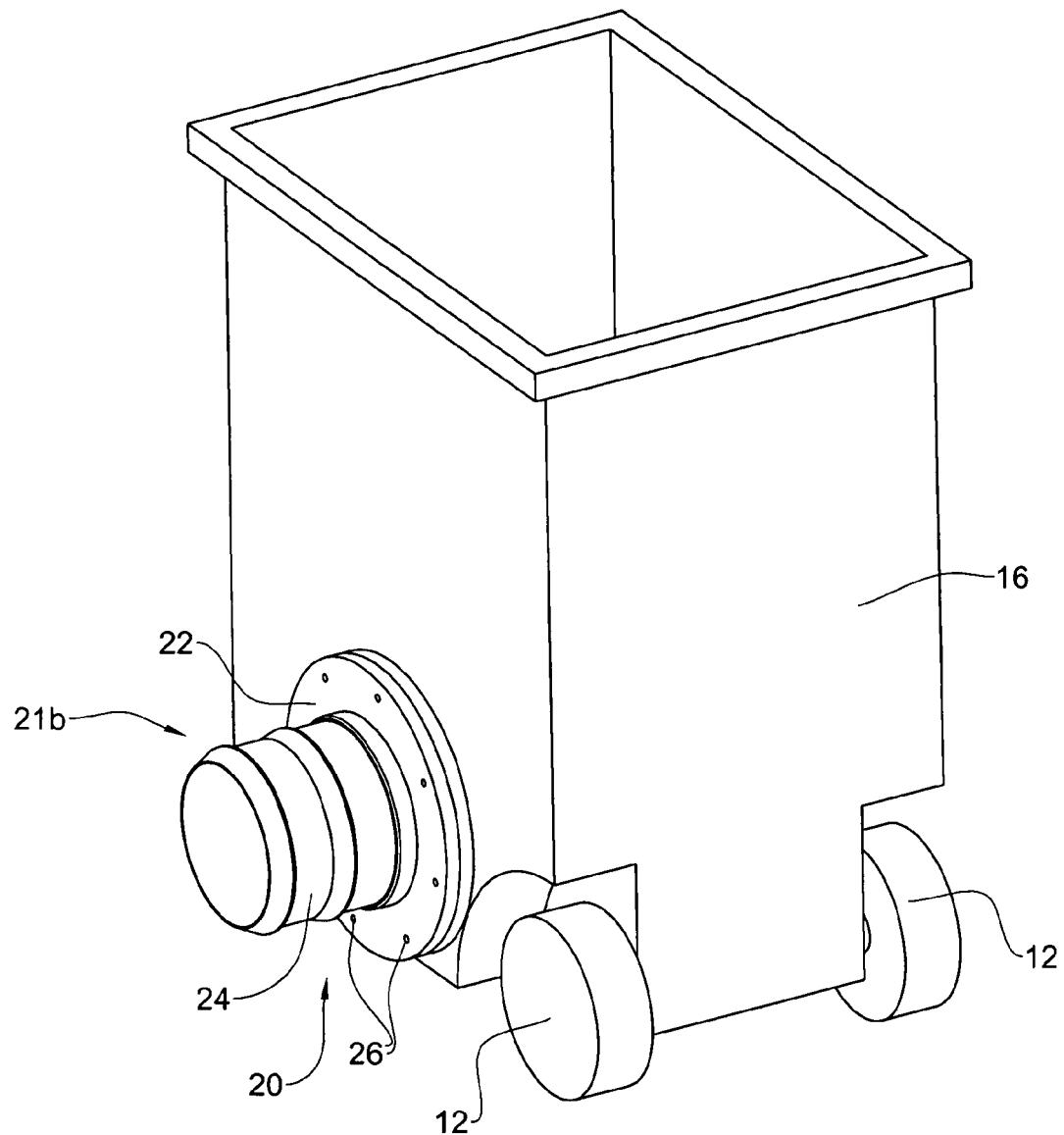
FIG. 2 is a perspective view of a primary reservoir of the water provisioning device illustrated in FIG. 1.

The primary reservoir 16, illustrated separately in FIG. 2, may be any receptacle which is open on top and which can hold liquid, such as for example a 360 liter plastic garbage bin as illustrated, and it may also be a metal tank or drum, or a concrete trough. The primary reservoir 16 is has a primary outlet opening (not seen) with a upstream and downstream outlet members 21a and 21b, respectively, mounted on the reservoir on two sides of the opening, to constitute a primary outlet thereof generally indicated at 20.

The downstream outlet member 21b is formed with a flange 22 adapted for sealing engagement to the wall of the primary reservoir, and a nipple 24 adapted for connection thereto of the irrigation pipe 14.

Figure 3A:
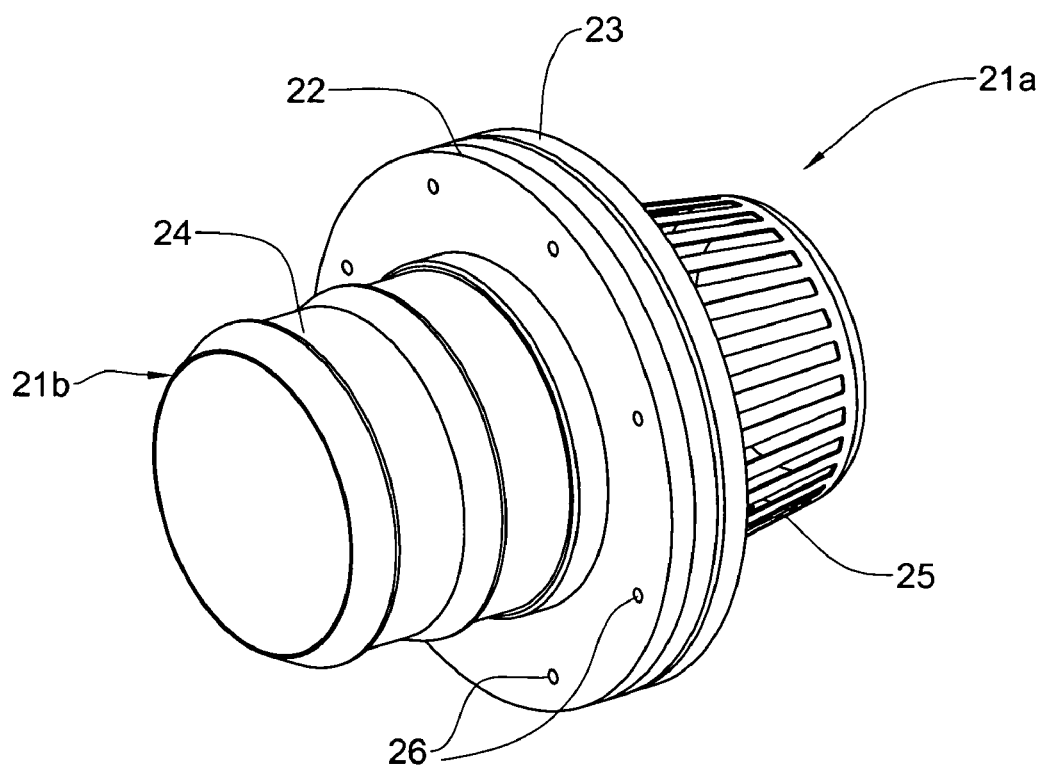
FIG. 3A is a perspective view of a primary outlet insert of the primary reservoir illustrated in FIG. 2.

As best seen in FIG. 3A, the upstream outlet member 21a is formed with a second flange 23 adapted to sealingly engage the interior side of the wall of the primary reservoir 16 and located opposite the flange 22. The two flanges 22, 23 are connected to one another with bolts 26 which pass through the wall of the primary reservoir and the flanges around the outlet opening. The upstream outlet member 21a is provided with a strainer 25.

Figure 3B:
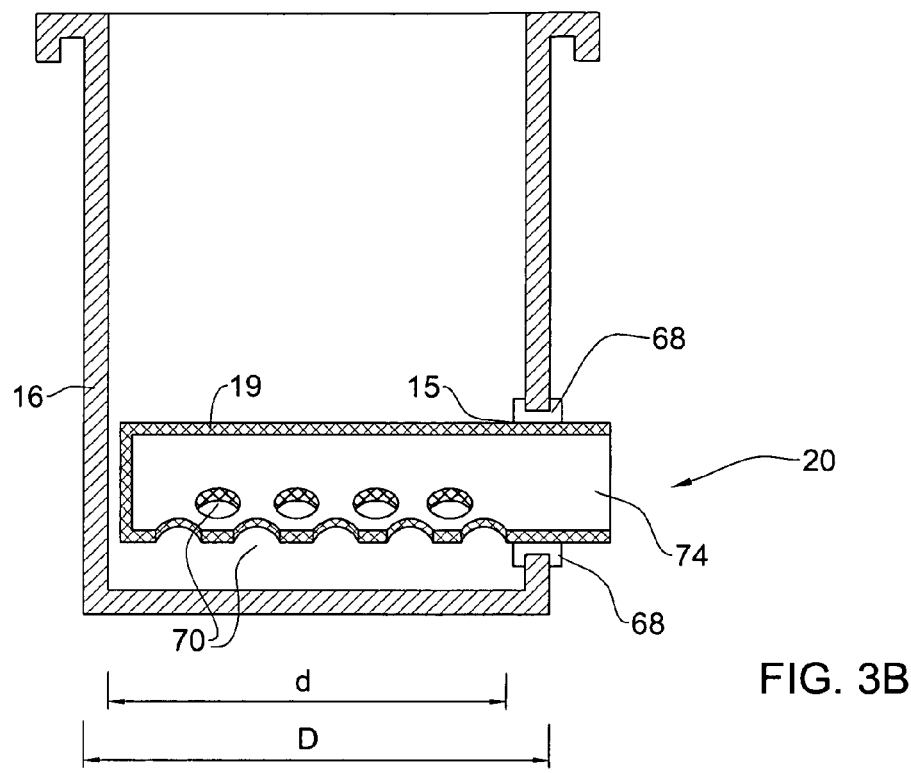
FIGS. 3B and 3C are cross-sectional views of the primary reservoir illustrated in FIG. 2 with other examples of primary outlets.
Figure 3C:
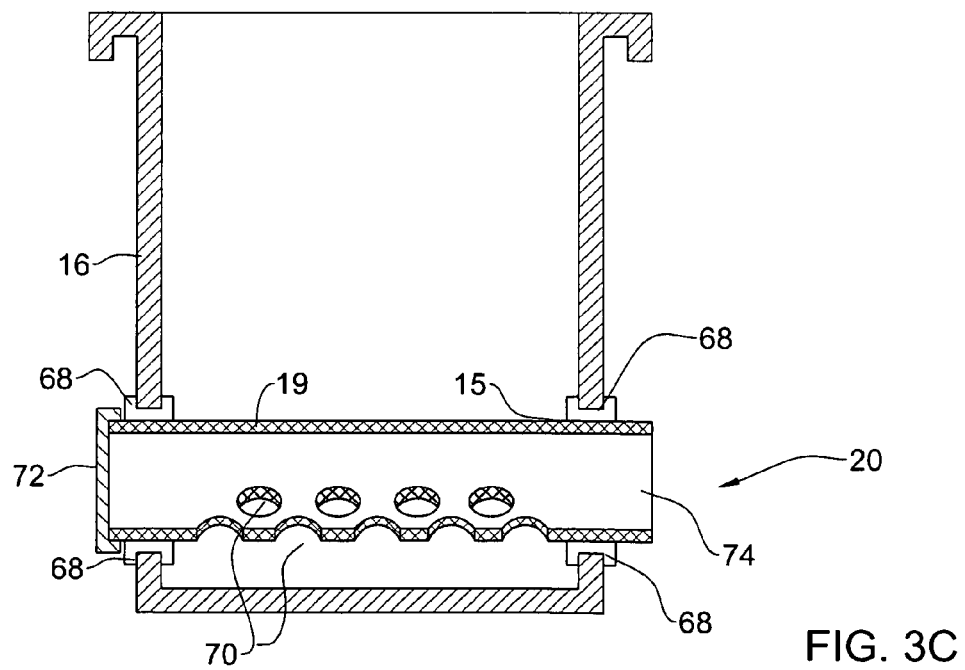

FIGS. 3B and 3C illustrate an alternative example of the primary outlet 20 which is now formed from a rigid tube 19 mounted in the primary reservoir 16 so as to substantially extend between two opposite sides thereof and to preferably project from the primary outlet opening designated at 15 in FIG. 3B. A plurality of apertures 70 are formed in the rigid tube 19, so that the outlet includes a strainer integral therewith, as explained below. The apertures are formed such that they are all on one half of the circumference thereof, and they all lie within a length d on the rigid tube 19, which is no larger than the interior distance between the sides of the primary reservoir 16. The irrigation pipe 14 (not illustrated in FIG. 3B or 3C) is fitted to open end 74.

The tube may be selected such that it is longer than one dimension D of the primary reservoir 16 between the two opposite sides to project from one of them. It may further be adapted to project from both sides, in which case an additional outlet opening is formed. The tube may be closed at one end, or open on both ends, in which case a cap 72 (seen in FIG. 3C) is fitted to one of the ends to close it.

The primary outlet opening 15 is sized so as to snuggly receive the rigid tube 19. Grommets 68 may be provided within the primary outlet opening 15, in which case the grommets are sized so as the snuggly receive the rigid tube 19, and the primary outlet opening is sized so as to receive the grommets.

It will be appreciated that while the outlet 19 described with reference to FIG. 3B passed through two opposite walls of the primary reservoir 16, this is not required. Alternatively, it may be inserted through a single hole in one sidewall. However, the former example results in a more stable outlet.

Figure 4:
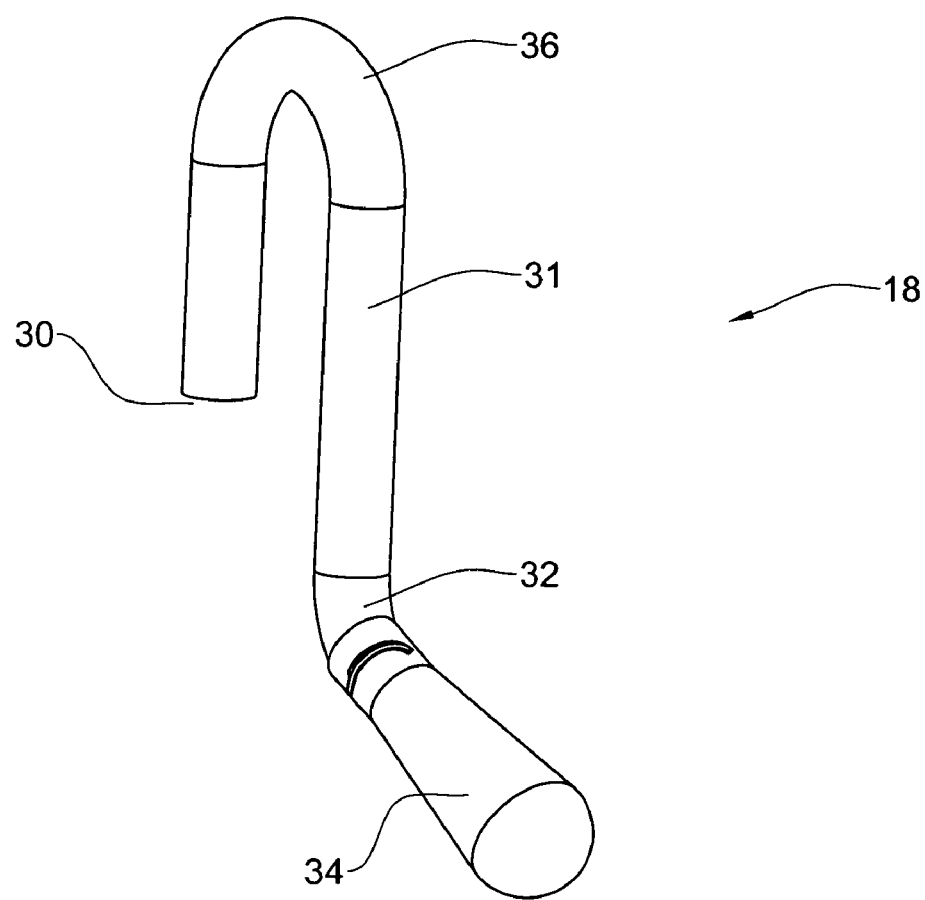
FIG. 4 is a perspective view of a primary inlet tube of the water provisioning device illustrated in FIG. 1.

As illustrated in FIG. 4, the primary inlet tube 18 is substantially U-shaped, and it has a proximal portion 29, with a proximal end 30, a distal portion 31 with a distal end 32 and an intermediate portion 36 therebetween, which may be flexible to facilitate moving of the proximal portion 29 and the distal portion 31 of the inlet tube 18 independently of one another. Fitted to the distal end 32 is a filter bag 34, whose filtering ability is selected based on the apertures in downstream irrigation devices (not shown) via which water exits the irrigation pipe.

Reverting to FIG. 1, in use, the primary reservoir 16 is placed adjacent or nearby to the irrigation channel 12 and the primary outlet tube 18 is mounted thereon so that its distal end 32 is disposed within the reservoir in such a position that the filter bag 34 is spaced from the primary outlet 20, whose strainer 25 prevents the filter bag 34 from being pulled into the primary outlet 20. The same effect can be realized in the example of the primary outlet 20 illustrated in FIGS. 3B and 3C. Due to the apertures 70 thereof facing downward, water may enter the tube while the filter bag is prevented from getting drawn therein.

It will be appreciated that the primary reservoir 16 may be placed several meters away from the irrigation channel 12 is desired or necessary, as long as the distance does not prevent use of the water provisioning device 10. However, in order to prevent overflow, the height of the primary reservoir 16 must be above the maximum water level in the irrigation channel 12.

When needed, the proximal end 30 of the primary inlet tube 18 is submerged within the water in the channel, and suction is initiated at the distal end 32 of the primary inlet tube, converting the tube into a siphon tube, via which water flows into the reservoir 16 under the influence of the suction. As the primary reservoir 16 fills, the irrigation pipe 14 is supplied with water via the primary outlet 20. In order to stop the flow of water, the proximal end 30 of the primary inlet tube 18 is lifted from the water in the channel.

Suction may be initiated at the distal end of the primary inlet tube in any appropriate way, which is facilitated by the flexibility of the intermediate portion 36. Thus, when initiating the suction, the proximal end 30 of the proximal portion 29 of the inlet tube 18 may be positioned within the irrigation channel 12 while the distal end 32 of the distal portion 31 is free to move. When breaking the suction, the distal end 32 may be held within the primary reservoir 16 while the proximal end 30 is lifted from the irrigation channel 12.

One example of how suction may be started is by submerging the entire inlet tube 18 below the surface of the water in the irrigation channel 12. Both the distal end 32 and the proximal end 30 are covered by the user's hands, who then places the distal end in the primary reservoir 16. The two ends are then uncovered.

Figure 9:
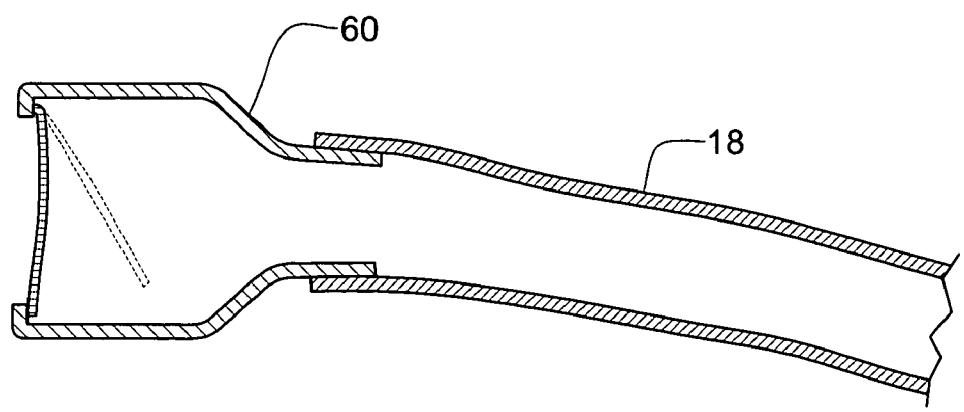
FIG. 9 is a cross sectional view of a tube with a flap-valve attached thereto, used to assist in establishing suction in the tube.

Another example is by using the push-pull method. The proximal end 30 is pushed and pulled under the surface of the water, while the distal end 32 is held in the water. During the pushing, the proximal end 30 is uncovered, and during the pulling, it is covered. The resulting vacuum along with the inertia of the water induces suction within the tube. In addition, a valve, such as a flap valve 60 as illustrated in FIG. 9, or a ball valve (not shown), may be fitted to the proximal end 30 of the inlet tube 18. The valve opens (indicated by the broken line in FIG. 9) during the pushing, and closes during the pulling, mimicking the action of a user's hand as described above.

Figure 10:
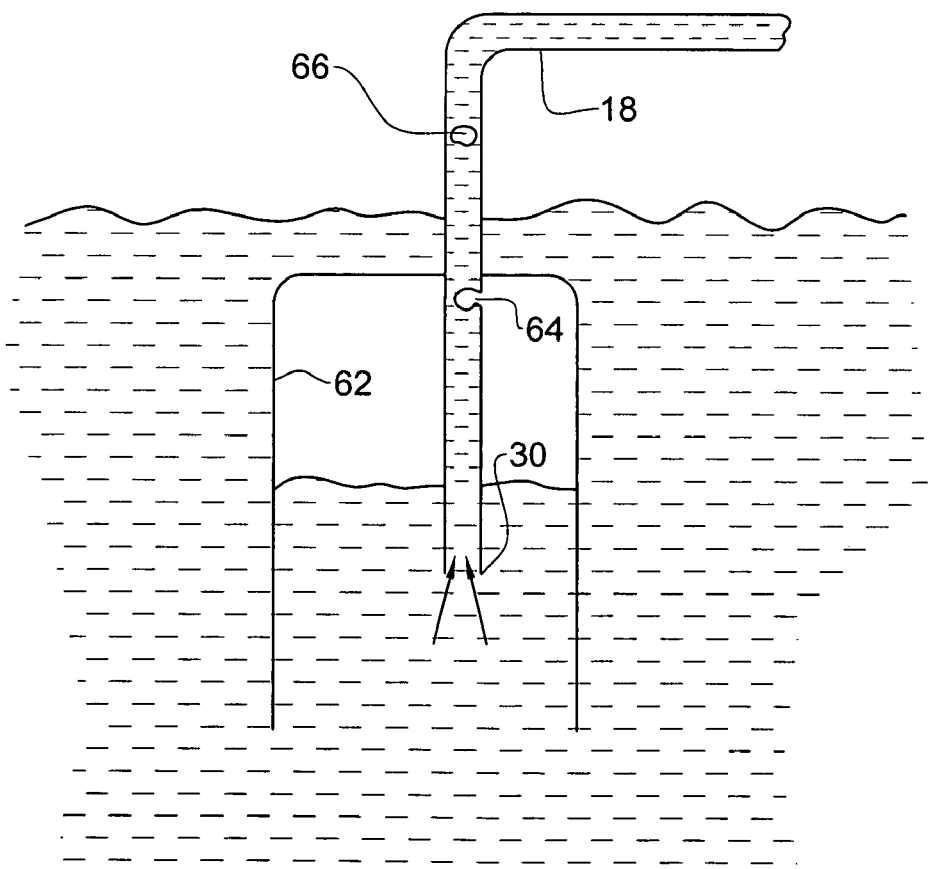
FIG. 10 is a cross sectional view of a tube with a larger diameter tube, used to assist in establishing suction therein.

Another example of how suction may be started is illustrated in FIG. 10. A large-diameter tube 62 is fitted around the proximal end 30 of the inlet tube 18. A hole 64 is made in the tube such that it is near the top of, yet still within, the large-diameter tube 62. The large-diameter tube 62 is plunged into the water in the irrigation channel 12. As water fills the large-diameter tube 62, it rushes into the inlet tube 18. In addition, the air above the water in the large-diameter tube 62 enters the inlet tube 18 via the hole 64, thereby forming bubbles 66. The combination of the rushing water and the rising bubbles establish flow within the inlet tube 18.

In addition to the above methods, hand siphon pumps are available, such as from McMaster-Carr, USA. These are typically most appropriate for small diameter tubes.

Figure 5:
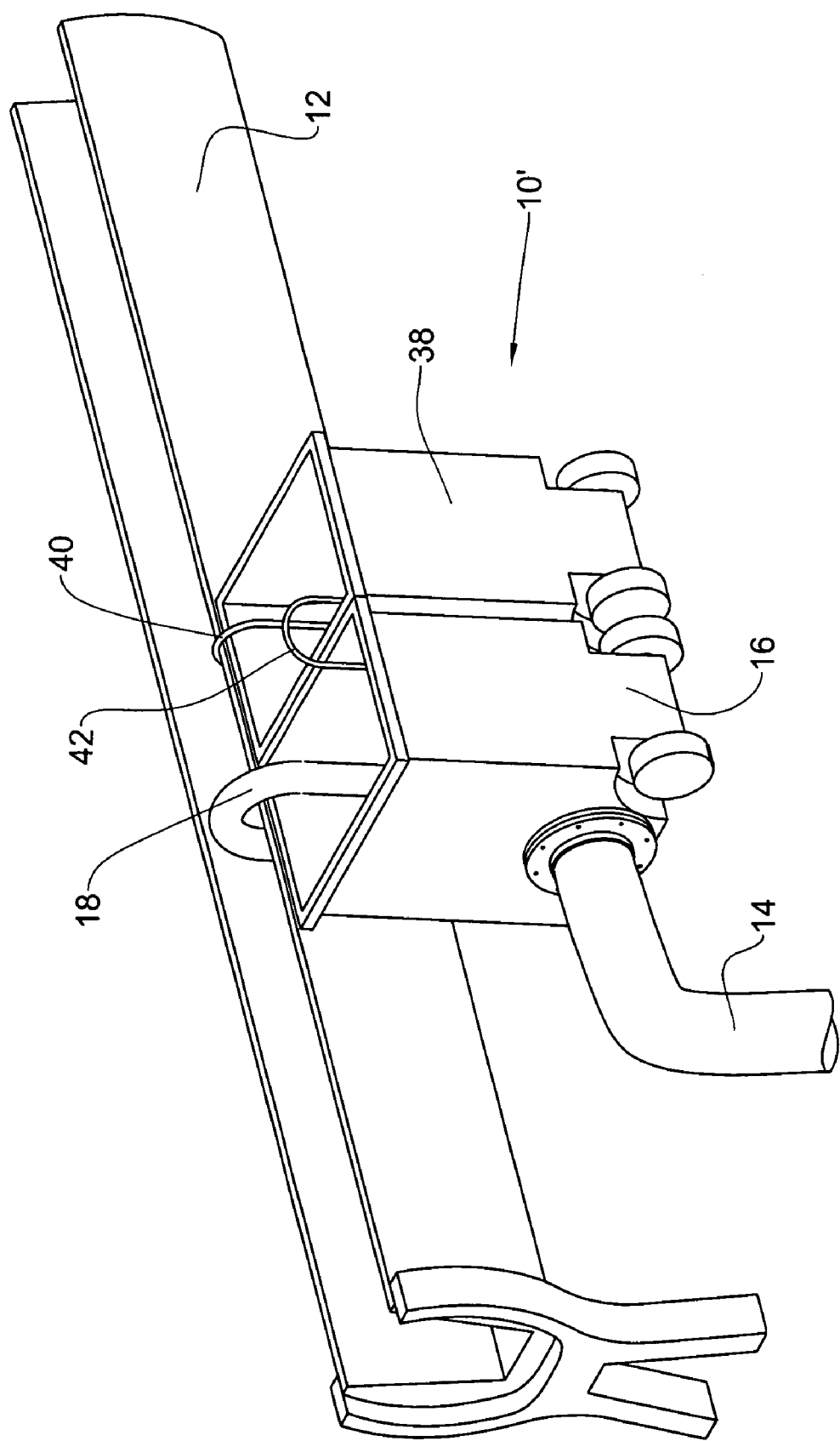
FIG. 5 is a perspective view of the water provisioning device in accordance with another embodiment of the present invention.
Figure 6:
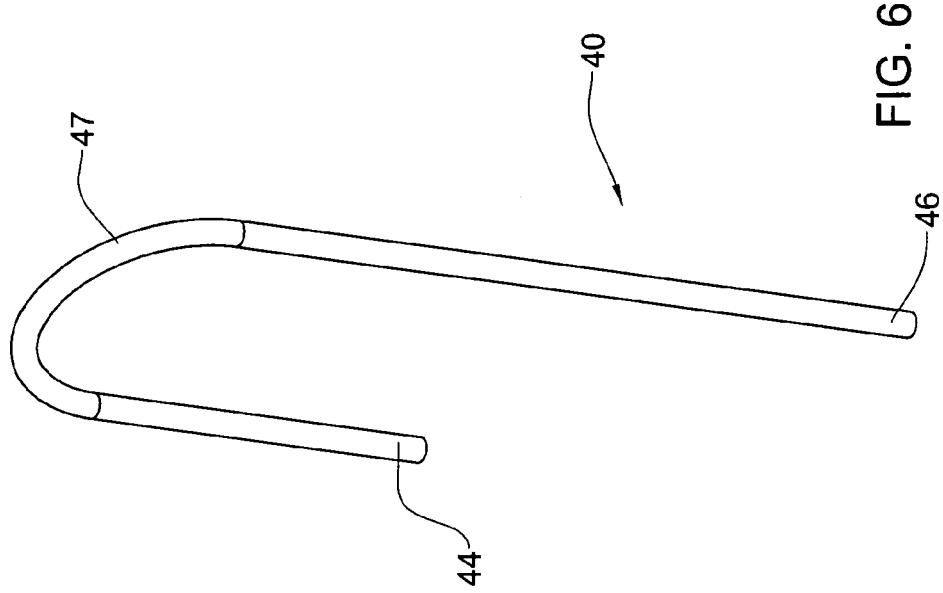
FIG. 6 is a perspective view of a secondary inlet tube of the device illustrated in FIG. 5.
Figure 7:
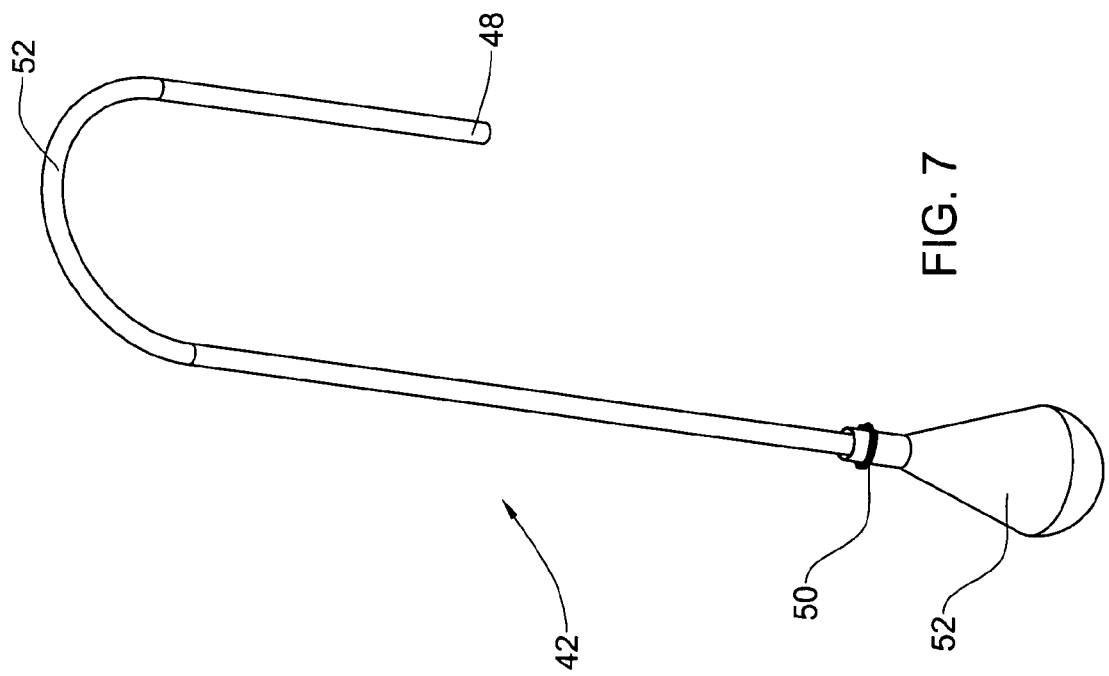
FIG. 7 is a perspective view of an additional tube of the device illustrated in FIG. 5.

FIG. 5 shows another example of a water provisioning device 10' according to the present invention, which has the same primary reservoir 16 and primary inlet tube 18 as the system 10 described above, and which further comprises a secondary reservoir 38 for fertilizing the water in the primary reservoir 16 before it enters the irrigation pipe 14. The secondary reservoir 38 is structurally similar to the primary reservoir 16, with the exception that the secondary reservoir lacks a built-in outlet. A secondary inlet tube 40 and secondary outlet tube 42 are provided for use with the secondary reservoir 38. The secondary inlet tube 40 is narrower than the primary inlet tube 18, and the secondary outlet tube 42 is narrower than the secondary inlet tube 40. As illustrated in FIG. 6, the secondary inlet tube 40 has a proximal end 44, a distal end 46 and a flexible portion 47. As illustrated in FIG. 7, the secondary outlet tube 42 has a proximal end 48, a distal end 50 fitted with a filter 52, and a flexible portion 52. The flexible portions 47, 52 may be useful as described above with reference to the flexible portion 36 of the primary inlet tube 18.

In use, when the primary reservoir 16 is prepared for use as described above, the secondary reservoir 38 is placed adjacent or nearby thereto and the secondary outlet tube is mounted between the two so that its distal end 50 is disposed within the primary reservoir 38. A predetermined amount of a fertilizer, which may be in granular or liquid form, is placed within the secondary reservoir 38. This amount may be the required total amount for the irrigation period. Alternatively, a user may add more fertilizer to the secondary reservoir 38 during use. While the proximal end 44 of the secondary inlet tube 40 is submerged within the water in the irrigation channel 12, suction is initiated at the distal end 46 of the secondary inlet tube in any appropriate way, converting the secondary inlet tube into a siphon tube. The distal end 46 of the tube 40 is placed within the secondary reservoir 16, with water flowing thereto under the influence of the suction. This water mixes with the fertilizer.

Once the secondary reservoir 38 fills with a sufficient amount of water, the proximal end 48 of the secondary outlet tube 42 is submerged therein and suction is initiated at the distal end 50 of the secondary outlet tube in any appropriate way, converting the tube 42 into a siphon tube. In this way the water/fertilizer mixture is added to the water within the primary reservoir 16 in order to be added to the irrigated water. The filter 50 prevents any impurities from being introduced to the irrigated water.

Figure 8:
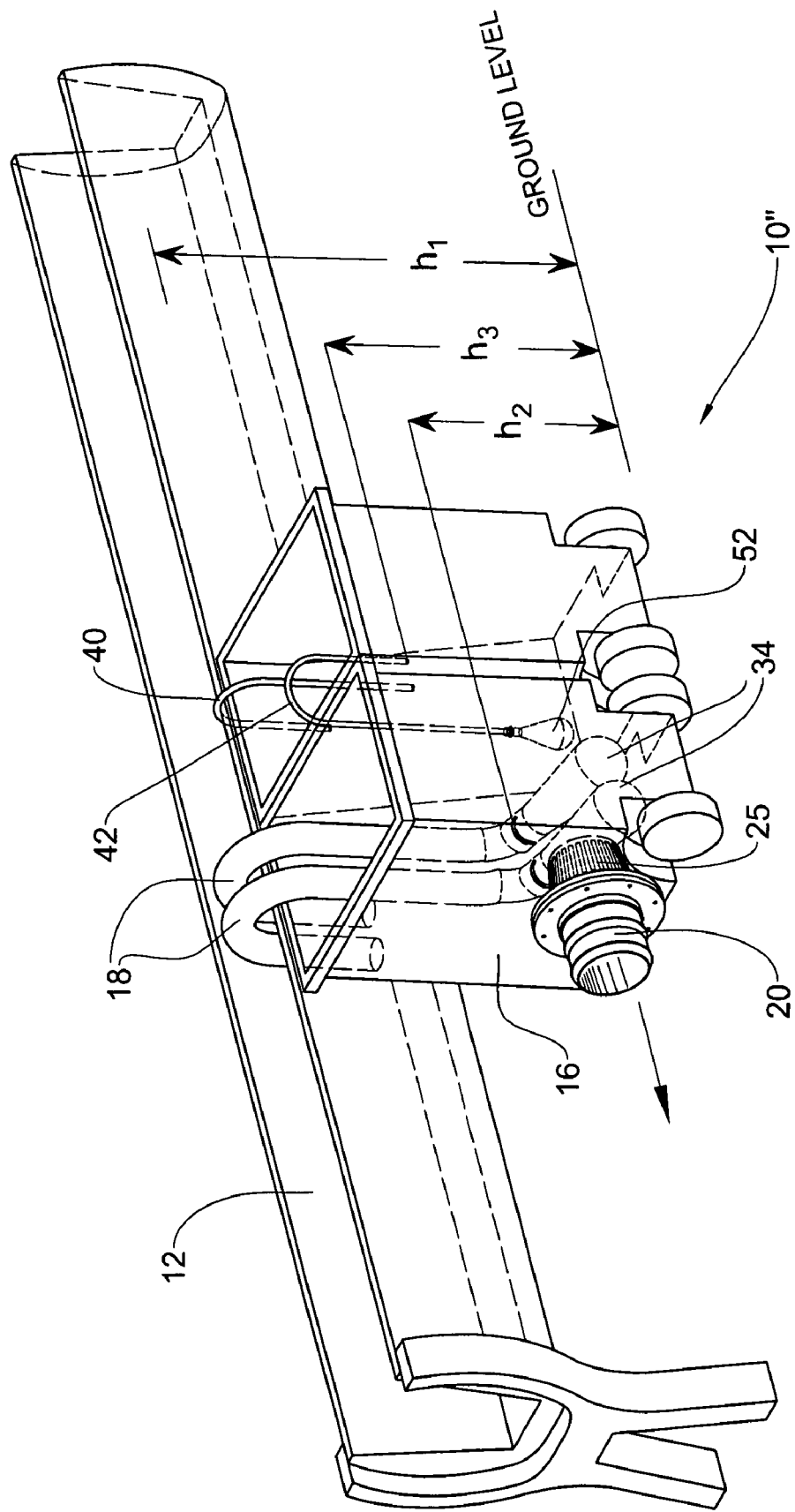
FIG. 8 is a perspective view of a water provisioning system according to still further embodiment of the present invention.

FIG. 8 shows a further example of a water provisioning device 10" of the present invention, which is similar to the system 10', with a difference between them being that instead of one primary inlet tube 18, two such tubes are used. FIG. 8 shows the system as if the primary and secondary reservoirs 16 and 38 are transparent to better illustrate mutual disposition of different components of the device and the heights of water level in the reservoirs relative to the ground level, at which the system is operable. In particular, with the water level in the channel 12 being at a height h1, the water level in the primary reservoir should be at a height h2 lower than h1, and the water level in the secondary reservoir should be at a height h3 which is lower than h1 but higher than h2.

While the inlet tubes 18, 40 have been described herein as comprising two solid portions with a flexible portion therebetween, the invention is not thus limited. The inlet tubes 18, 40, as well as the secondary outlet tube 42, may be flexible along their entire lengths, depending on the method to be used for initiating suction. If the distal end 46 of the secondary inlet tube 40 is flexible, it may be coiled and placed on a pile of granular fertilizer. In this way, as the granules dissolve, and the level of fertilizer lowers, the distal end 46 of the secondary inlet tube 40 is lowered with it without becoming blocked by the granules.

Those skilled in the art to which this invention pertains will readily appreciate that numerous changes, variations and modifications can be made without departing from the scope of the invention mutatis mutandis.

The invention claimed is:

1. A water provisioning device for forwarding water from an irrigation channel into an irrigation pipe, said device comprising a primary reservoir adapted to hold a predetermined amount of water and having a primary outlet adapted for being brought in fluid communication with the irrigation pipe, and at least one primary inlet tube in the form of a siphon tube with a proximal end insertable into said channel for drawing water therefrom and a distal end adapted for the initiation of suction within the tube and for the disposition in said reservoir at least after the suction has been initiated, to supply said water thereto.

2. A water provisioning device according to claim 1, wherein said irrigation pipe is a part of a low-pressure irrigation system.

3. A water provisioning device according to claim 1, wherein the distal end of said primary inlet tube comprises a filter.

4. A water provision device according to claim 1, wherein the at least one primary inlet tube comprises at least one flexible portion between the distal and proximal ends thereof.

5. A water provision device according to claim 1, further comprising a strainer fitted to an upstream end of the primary outlet.

6. A water provision device according to claim 1, further comprising a strainer formed integrally with the primary outlet.

7. A water provisioning device according to claim 1, further comprising a secondary reservoir with a secondary outlet adapted for bringing the secondary reservoir into fluid communication with the primary reservoir, the secondary reservoir further comprising at least one secondary inlet tube in the form of a siphon tube with a proximal end insertable into said channel for drawing water therefrom, and a distal end adapted for the initiation of suction within the secondary inlet tube and for the disposition of said distal end in said secondary reservoir at least after the suction has been initiated, to supply said water into the secondary reservoir.

8. A water provision device according to claim 7, wherein the secondary outlet is in the form of a siphon tube.

9. A water provision device according to claim 7 wherein the distal end of the at least one secondary inlet tube and/or secondary outlet is provided with a filter.

10. A water provision device according to claim 7, wherein the at least one secondary inlet tube comprises at least one flexible portion.

11. A water provision device according to claim 7, wherein said secondary outlet is in the form of an additional siphon tube with a proximal end inserted into said reservoir for drawing water therefrom and a second end adapted for the initiation of suction therewithin and for the disposition in said primary reservoir at least after the suction has been initiated, to supply water from the secondary reservoir into the primary reservoir.

12. A water provision device according to claim 8 wherein the distal end of the at least one secondary inlet tube and/or secondary outlet is provided with a filter.

* * * * *